United States Patent Office 3,178,252
Patented Apr. 13, 1965

3,178,252
PROCESS FOR THE COLOURATION OF POLYESTER FIBER MATERIAL
Jacob Koch and Max Jost, Basel, Switzerland, assignors to Ciba Limited, Basel, Switzerland, a company of Switzerland
No Drawing. Filed Feb. 18, 1963, Ser. No. 259,363
Claims priority, application Switzerland, Feb. 21, 1962, 2,091/62
7 Claims. (Cl. 8—39)

This invention is based on the observation that valuable dyeings and prints can be obtained on fibrous material made of or containing aromatic polyesters by using anthraquinone dyestuffs that contain an amino group in 1-position and a heterocyclic radical comprising at most three condensed rings in 2-position.

The heterocyclic radical of the dyestuffs to be used in the process of the invention advantageously contains two hetero atoms in the heterocycle.

Of special interest are dyestuffs of the formula

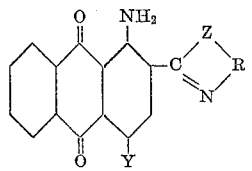

in which Y represents a hydrogen atom or a hydroxyl group or an amino group that may be alkylated, Z represents a sulfur or an oxygen atom or an imino group, and R represents an ethylene radical or an ortho-arylene radical that contains at most two substituents.

The ortho-arylene radical is advantageously a phenylene radical or a naphthalene radical that can contain as substituents alkyl, alkoxy, amino, arylsulfonyl or amidosulfonyl radical or halogen atoms.

Dyestuffs that contain an oxazole radical as heterocyclic radical are advantageously used, especially one containing a benzoxazole radical.

As examples of the dyestuffs which may be used in the process of the invention may be mentioned anthraquinones of the formula

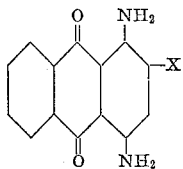

in which X represents a radical of the formula

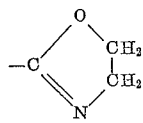

or a benzoxazole radical that may be substituted, for example, in 5-position by a substituent such as a phenyl, methyl, methoxy or amino group or by a chlorine or bromine atom or by a phenylene radical at 4:5- or 5:6-position.

As further examples dyestuffs of the above formula may also be mentioned in which X represents a benzthiazole or benzimidazole radical, that can likewise contain the above-mentioned substituents in the phenyl nucleus, and also dyestuffs of the above formula in which X represents an oxidiazole radical that can contain a phenyl or alkyl radical in 5-position.

The following dyestuffs which can be used in the process of the invention may also be mentioned: 1-amino-4-hydroxy-2-(2'-benzoxazolyl)-anthraquinone, 1-amino-4-cyclohexylamino-2-(2'-benzoxazolyl)-anthraquinone and 1-amino-2-(2'-benzoxazolyl)-anthraquinone.

Most of the aforementioned dyestuffs are known compounds which can be prepared by known methods, for example, by the condensation of 1-amino-4-nitro-anthraquinone-2-carboxylic acid chloride with an amine containing a hydroxyl, mercapto or an amino group in a position vicinal to the amino group, for example, ortho-aminophenol, ortho-amino-thiophenol or ortho-phenylene-diamine, to form the corresponding acid amide as an intermediate compound, ring closure by the action of paratoluene sulfonic acid mono-hydrate in a high-boiling point solvent and reduction of the nitro group, for example, with sodium sulfide.

If 1-amino-anthraquinone-2-carboxylic acid halides are used instead of 1-amino-4-nitro-anthraquinone-2-carboxylic acid halides, dyestuffs are obtained which are derived from 1-amino-anthraquinone.

Mixtures of dyestuffs can also be used instead of the single dyestuffs, for example, a mixture of two of the dyestuffs to be used in the process of the invention.

In the dyeing operation the aforesaid dyestuffs or mixtures thereof are advantageously used in a finely divided form, and dyeing is carried out in the presence of dispersing agents such as soap, sulfite cellulose waste liquor or synthetic detergents or in the presence of a combination of different wetting and dispersing agents. Before dyeing, it is generally of advantage to convert the dyestuffs to be used into a dyeing preparation that contains a dispersing agent and the finely divided dyestuff in such a form that a fine dispersion is obtained when the said dyestuff preparation is diluted with water. Dyestuff preparations of the kind defined can be prepared in known manner, for example, by reprecipitating the dyestuff from sulfuric acid and grinding the suspension so obtained in the presence of sulfite waste liquor, and, if desired, by grinding the dyestuff in the dry or wet state in a highly efficient grinding device with or without the addition of dispersing agents.

In order to obtain stronger dyeings on polyethylene terephthalate fibers it is generally of advantage to add a swelling agent to the dyebath or more especially to carry out the dyeing process under superatmospheric pressure at a temperature above 100° C., for example, at 120° C. Suitable swelling agents are aromatic carboxylic acids, for example, benzoic acid or salicylic acid, phenols such as ortho- or para-hydroxydiphenyl, aromatic halogen compounds such as chlorobenzene, ortho-dichlorobenzene or trichlorobenzene, phenylmethyl-carbinol or diphenyl. When dyeing under superatmospheric pressure it is generally of advantage to render the dyebath slightly acid, for example, by the addition of a weak acid, for example, acetic acid.

The dyestuffs to be used in the process of the invention are suitable for application by the so-called thermofixation process in which the fabric to be dyed is impregnated advantageously at a temperature not exceeding 60° C. with an aqueous dispersion of the dyestuff that advantageously contains 1 to 50% of urea and a thickening agent, especially sodium alginate, and squeezed in the usual manner. The fabric is advantageously squeezed in such a manner that it retains 50 to 100% of the dye liquor calculated on its dry weight.

Fixation of the dyestuff is effected by heating the impregnated fabric, advantageously after intermediate drying, for example, in a current of hot air, to a temperature above 100° C., for example, between 180 and 220° C.

The aforesaid thermofixation dyeing process is of special interest for the dyeing of union fabrics made of polyester fibers and cellulosic fibers, especially cotton.

In this case, the padding liquor contains dyestuffs suitable for cotton in addition to the dyestuffs to be used in the process of the invention, the dyestuffs for cotton advantageously being vat dyestuffs or reactive dyestuffs, that is to say, dyestuffs that can be fixed to the cellulosic fiber by the formation of a chemical bond, for example, dyestuffs that contain a chlorotriazine radical or a chlorodiazine radical. In the last-mentioned case it is generally of advantage to add an agent capable of binding acid to the padding solution, for example, an alkali carbonate, alkali phosphate, alkali borate or alkali perborate or mixtures of these substances. When using vat dyestuffs, the padded fabric has to be treated with an aqueous alkaline solution of one of the reducing agents normally used in vat dyeing after it has been subjected to the heat treatment.

The dyeings obtained by the process of the invention are advantageously subjected to an after-treatment, for example, heating with an aqueous solution of a non-ionic detergent.

In the process of the invention, the aforesaid dyestuffs can also be applied to the fabric by a printing process instead of by impregnation. To this end, for example, a printing paste may be used that contains, in addition to the assistants normally used in printing such as wetting and thickening agents, the finely dispersed dyestuff, if necessary, in admixture with one of the above-mentioned cotton dyestuffs, if necessary, in the presence of urea and/or an agent capable of binding acid.

The process of the invention yields strong, full dyeings and prints possessing excellent properties of wet fastness and more especially an excellent fastness to light and an excellent fastness to sublimation.

Unless otherwise stated, the parts and percentages in the following examples are by weight:

*Example 1*

1 part of an aqueous paste of the dyestuff of the formula

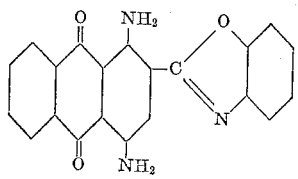

and approximately 1 part of dried sulfite cellulose waste liquor were ground to a fine paste in a roller mill, the paste so obtained having a dyestuff content of approximately 10%.

100 parts of fibrous material made of polyethylene terephthalate were washed for 30 minutes in a bath containing 1 to 2 parts of the sodium salt of N-benzyl-μ-heptadecyl-benzimidazole-disulfonic acid and 1 part of a concentrated aqueous ammonia solution in 1000 parts of water. The material was then entered into a dyebath of 3000 parts of water in which the dyestuff paste obtained as described above and 4 parts of the sodium salt of N-benzyl-μ-heptadecylbenzimidazole disulfonic acid had been dispersed. The whole was then heated to 120° C. in a pressure vessel and the temperature maintained at 120° C. for approximately ½ hour. The material was then well rinsed and, if necessary, washed for 30 minutes at 60 to 80° C. in a solution containing 1 part of the sodium salt of N-benzyl-μ-heptadecylbenzimidazole disulfonic acid per 1000 parts of water. A blue dyeing possessing an excellent fastness to sublimation and an excellent fastness to light was obtained.

*Example 2*

100 parts of fibrous material made of polyethylene terephthalate were washed for 30 minutes in a bath containing 1 to 2 parts of the sodium salt of N-benzyl-μ-heptadecylbenzimidazole disulfonic acid and 1 part of a concentrated aqueous ammonia solution per 1000 parts of water. The material was then entered into a dyebath containing 15 parts of a mixture comprising approximately equal parts of orthohydroxydiphenyl, pine-oil and sulfonated castor oil, and 15 parts of acetic acid per 300 parts of water, and allowed to swell therein for ½ hour at 80° C. The bath was then allowed to cool to 50° C., and the dyestuff paste obtained as described in Example 1 was added. The bath was brought to the boil in the course of ½ to ¾ hour and dyeing continued for 1 to 1½ hours as close to the boil as possible. The material was then well rinsed and, if necessary, washed for 30 minutes at 60 to 80° C. in a solution containing 1 part of the sodium salt of N-benzyl-μ-heptadecylbenzimidazole disulfonic acid per 1000 parts of water. A blue dyeing possessing an excellent fastness to sublimation and an excellent fastness to light was obtained.

*Example 3*

The following ingredients were mixed together:

300 parts of gum arabic (1:1)
300 parts of crystal gum (1:2)
250 parts of water
40 parts of cyclohexanone
40 parts of thiodiglycol
50 parts of a 10% solution of the sodium salt of metanitrobenzene sulfonic acid
20 parts of a mixture of potassium oleate and pine-oil

1000

200 parts of the dyestuff used in Example 1 were stirred into 800 parts of the above stock thickening by means of a high-speed stirrer until the mixture was completely dispersed. A fabric made of polyethylene terephthalate was printed with this paste. After printing, the fabric was dried, steamed for 45 minutes at ¾ atmosphere (gauge), rinsed for 10 minutes in cold water, centrifuged and dried. A fast blue print was obtained.

*Example 4*

14 parts of the dyestuff used in Example 1 were finely ground in a ball mill in 126 parts of a neutral solution of 125 parts of dinaphthylmethane disulfonic acid in 1000 parts of water.

A padding liquor having the following composition was prepared:

200 parts of the dyestuff paste described above
300 parts of sodium alginate 1:100
500 parts of water 1000 parts A polyester fabric was padded with the above padding liquor (2 runs) in such a manner that its weight increased by 50 to 60%, and then dried at 60° C. The fabric was then subjected to a heat treatment for 15 to 120 seconds at 200 to 220° C., soaped at the boil for 30 minutes with a solution of 5 grams of soap in 1 liter of water and further treated in the usual manner (rinsing, drying). A pure blue dyeing was obtained possessing excellent properties of fastness.

By using one of the dyestuffs listed in column I of the following table instead of the dyestuff used in Example 1, a dyeing very fast to light and sublimation is obtained of the shade given in column II.
| I | II | III |
|---|---|---|
| 1 | 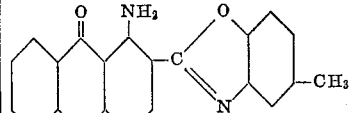 | Blue. |
| 2 | 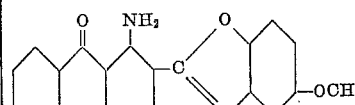 | Do. |
| 3 | 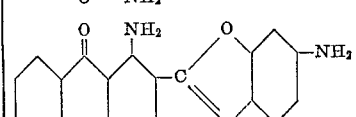 | Do. |
| 4 | 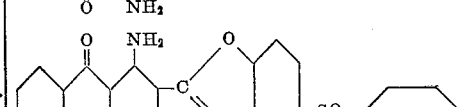 | Do. |
| 5 | 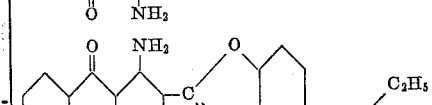 | Do. |
| 6 | 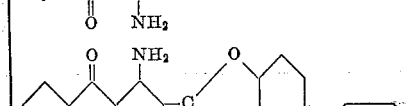 | Do. |
| 7 | 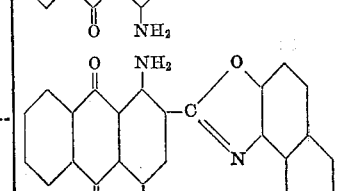 | Green. |
| 8 | 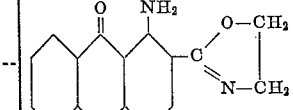 | Blue. |
| 9 | 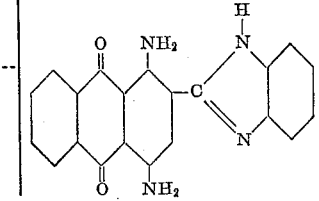 | Do. |

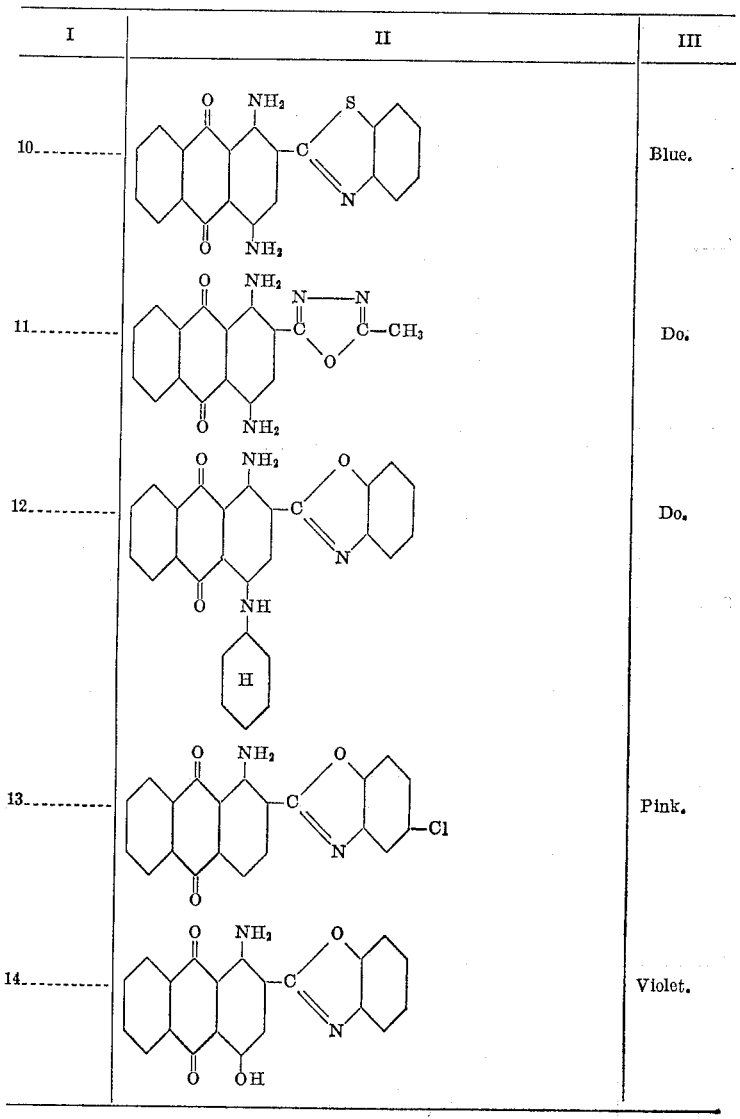

| I | II | III |
|---|---|---|
| 10 | | Blue. |
| 11 | | Do. |
| 12 | | Do. |
| 13 | | Pink. |
| 14 | | Violet. |

*Example 5*

200 parts of urea and 20 parts of the dyestuff of the formula

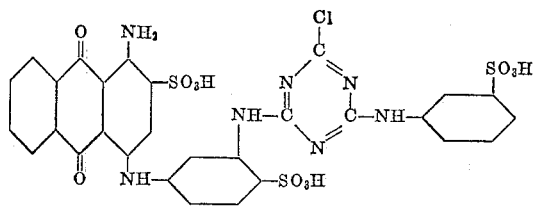

were dissolved by boiling in 400 parts of water. To the solution so obtained were added 100 parts of an aqueous dispersion containing 22 parts of the dyestuff used in Example 1 together with 2 parts of the sodium salt of di-isobutylnaphthalene sulfonic acid and the mixture well stirred for a few minutes by means of a high-speed stirrer while adding 100 parts of a 20% sodium carbonate solution and 400 parts of a 50% sodium alginate solution.

A union fabric consisting of 35 parts of cotton and 65 parts of polyethylene terephthalate fiber were padded at 50 to 60° C. with the padding solution so prepared, the impregnated fabric being squeezed so that it retained 65 to 70% of padding liquor, calculated on its dry weight. The fabric was then dried and subsequently subjected to a heat treatment for 1 minute at 200 to 210° C.

The fabric was then washed at the boil for 20 minutes in a solution containing 2 grams per liter of an non-ionic detergent and 2 grams per liter of calcined sodium carbonate, rinsed and dried. A pure blue dyeing prossessing very good properties of fastness was obtained.

*Example 6*

14 parts of the dyestuff used in Example 1 and 14 parts of dichlorinated indanthrone were finely ground in a ball mill with 28 parts of dinaphthylmethane disulfonic acid and 84 parts of water. A padding liquor of the following composition was prepared:

200 parts of the above dyestuff paste
300 parts of sodium alignate 1:100
500 parts of water
———
1000 parts A union fabric made of polyester and cotton was padded with the above padding liquor (2 runs) in such a manner that its weight increased by 50 to 60%, and then dried at 60° C. After being subjected to a heat treatment for 15 to 120 seconds at 200 to 220° C. the fabric was treated for 10 minutes at 60° C. and then for 20 minutes at 50° C. in a bath containing 4 grams per liter of sodium hydrosulfite, 6 grams per liter of sodium hydroxide solution of 36° Bé. and 30 grams per liter of sodium chloride. The fabric was then oxidized, rinsed, and further treated as described in Example 1. A blue dyeing possessing excellent properties of fastness was obtained.

What is claimed is:

1. Polyalkylene terephthalate fibers dyed with a dyestuff of the formula

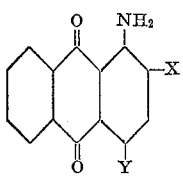

in which Y represents a member selected from the group consisting of hydroxy, amino, lower alkyl and cycloalkylamino and X represents a member selected from the group consisting of the radicals of the formulae

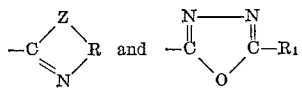

wherein Z represents a member selected from the group consisting of sulfur, oxygen and imino, R is a member selected from the group consisting of ethylene and ortho phenylene and ortho naphthylene, $R_1$ is a member selected from the group consisting of lower alkyl and phenyl.

2. Polyalkylene terephthalate fibers dyed with a dyestuff of the formula

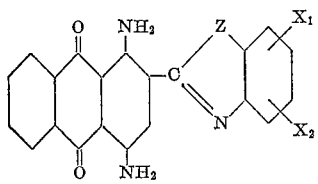

in which Z is a member selected from the group consisting of sulfur, oxygen and imino, $X_1$ and $X_2$ members selected from the group consisting of hydrogen, chlorine, lower alkyl, lower alkoxy, phenylsulfonyl and lower dialkylamido-sulfonyl.

3. Polyethylene terephthalate fibers dyed with a dyestuff of the formula

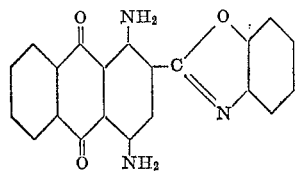

4. Polyethylene terephthalate fibers dyed with a dyestuff of the formula

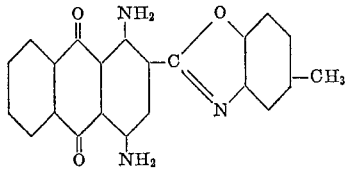

5. Polyethylene terephthalate fibers dyed with a dyestuff of the formula

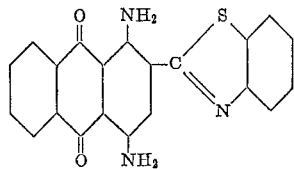

6. Polyethylene terephthalate fibers dyed with a dyestuff of the formula

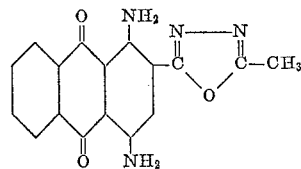

7. Polyethylene terephthalate fibers dyed with a dyestuff of the formula

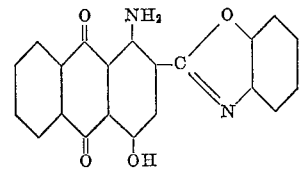

References Cited by the Examiner

UNITED STATES PATENTS

| | | |
|---|---|---|
| 2,882,119 | 4/59 | Laucius et al. |
| 3,065,238 | 11/62 | Weidinger et al. ____ 260—307.5 X |
| 3,074,945 | 1/63 | Staeuble et al. |

NORMAN G. TORCHIN, *Primary Examiner.*